United States Patent
McTague et al.

(10) Patent No.: US 6,931,706 B2
(45) Date of Patent: Aug. 23, 2005

(54) DISK DRIVE PREPARATION JIG ASSEMBLY

(75) Inventors: Michael McTague, County Clare (IE); Fergal Duffy, Limerick (IE)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 10/292,716

(22) Filed: Nov. 12, 2002

(65) Prior Publication Data

US 2003/0217461 A1 Nov. 27, 2003

(30) Foreign Application Priority Data

May 24, 2002 (IE) .......................................... 2002/0432

(51) Int. Cl.[7] ................................................ B23Q 7/00
(52) U.S. Cl. ................ 29/407.09; 29/407.1; 29/525.11; 29/559; 29/281.1; 269/289 R; 81/57.22; 361/727
(58) Field of Search .......................... 29/603.03, 407.09, 29/407.1, 464, 559, 525.01, 525.11, 709, 737, 700, 760, 240, 252, 281.1, 281.5; 269/25, 87, 140, 216, 289 R; 81/57.22; 361/685, 727

(56) References Cited

U.S. PATENT DOCUMENTS

| | | | |
|---|---|---|---|
| 4,260,208 A | * | 4/1981 | Lun Ho et al. ............. 312/242 |
| 4,862,584 A | * | 9/1989 | Budy et al. .................... 29/704 |
| 5,233,594 A | | 8/1993 | Wilhelm |
| 5,349,483 A | | 9/1994 | Tsai |
| 5,485,348 A | | 1/1996 | Oros |
| 5,488,538 A | | 1/1996 | Wakita |
| 5,564,804 A | | 10/1996 | Gonzalez et al. |
| 5,654,874 A | | 8/1997 | Suzuki |
| 6,181,565 B1 | | 1/2001 | Schmitt et al. |
| 6,252,766 B1 | | 6/2001 | Radloff |
| 6,321,437 B1 | * | 11/2001 | Sloan et al. ............. 29/525.01 |
| 6,388,873 B1 | * | 5/2002 | Brooks et al. ............. 361/685 |
| 6,571,454 B1 | * | 6/2003 | Haney et al. ............ 29/603.03 |
| 6,600,648 B2 | * | 7/2003 | Curlee et al. ............... 361/685 |

* cited by examiner

Primary Examiner—David P. Bryant
Assistant Examiner—Jermie E. Cozart
(74) Attorney, Agent, or Firm—Haynes and Boone, LLP

(57) ABSTRACT

A jig assembly for preparing a disk drive for mounting in a computer comprises a bay arranged to receive a disk drive and a pair of side rails to be fixed to opposite edges of the disk drive. Each side rail has captive screws in register with a respective screw-threaded hole in the edge of the disk drive. Two powered screwdrivers on each side of the bay are in register with the screws and are mounted for movement towards and away from the respective side rail. When the disk drive and rails are loaded into the bay, pneumatic cylinders C1 automatically advance the screwdrivers towards the side rail to engage and rotate the screws to screw the side rails tight against the edge of the disk drive, and then retract the screwdrivers.

14 Claims, 4 Drawing Sheets

DISK DRIVE PREPARATION JIG ASSEMBLY

BACKGROUND

The present disclosure relates to a jig assembly for preparing a disk drive for inclusion in a computer.

Typically, during a hard disk drive (HDD) preparation process, side rails are attached to the edges of the HDD with 4 screws, two on each side. An example is shown in FIG. 4, where respective side rails 10 are attached by screws 12 to the respective side edges 14 of an HDD 16. Conventionally this is done manually using a hand-held power screwdriver. This is a time consuming process which induces shock (head slap).

SUMMARY

The object of the disclosure is to provide a jig assembly which is capable of reducing the HDD preparation process time and reducing measurable shock.

Accordingly, the present disclosure provides a jig assembly for preparing a disk drive for mounting in a computer.

A disk drive receiving bay is arranged to receive a disk drive in a first datum position and to receive a pair of side rails each in a second datum position.

At least one powered screwdriver is provided on each side of the bay, each screwdriver has a tool bit in register with a respective screw-threaded fixing device when a respective side rail is in the second datum position.

A respective actuator is provided for advancing each screwdriver towards the respective side rail such that the tool bit engages the respective screw-threaded fixing device, rotation of the tool bit causing the screw-threaded fixing device to be advanced into the screw-threaded hole in the respective edge of the disk drive whereby the side rail is retained tight against the edge of the disk drive, and for thereafter retracting the screwdriver.

BRIEF DESCRIPTION OF THE DRAWINGS

An embodiment of the present disclosure will now be described with reference to the accompanying drawings, in which.

DETAILED DESCRIPTION

Figure 3:
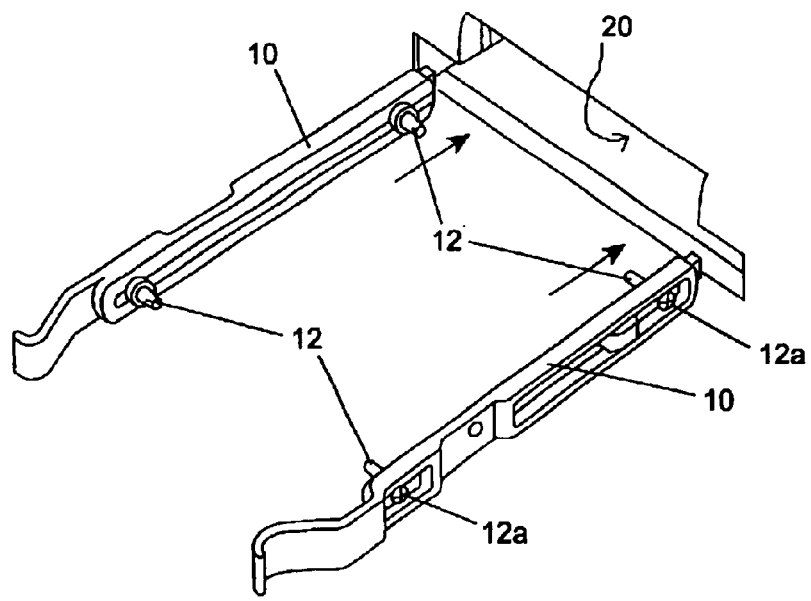
FIG. 3 illustrates an embodiment of the act of loading the disk drive side rails into the jig assembly of FIG. 1.
Figure 4:
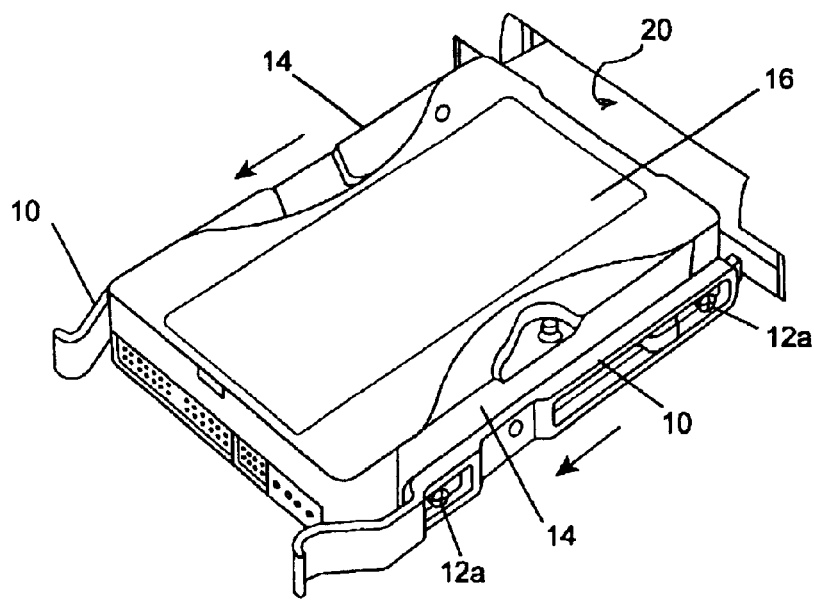
FIG. 4 illustrates an embodiment of a prepared disk drive being withdrawn from the jig assembly of FIG. 1.

Referring to the drawings, the jig assembly is designed to automatically screw two side rails 10, FIGS. 3 and 4, to respective opposite side edges 14 of a hard disk drive (HDD) 16, each side rail 10 being affixed using two captive screws 12.

Figure 2:
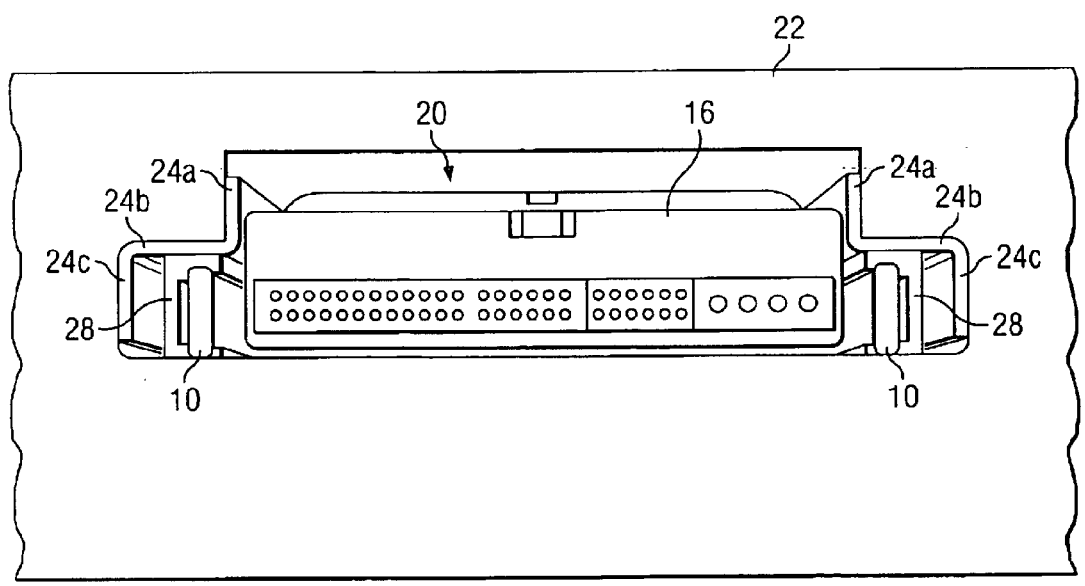
FIG. 2 is a front view of an embodiment of the jig assembly of FIG. 1 with a loaded disk drive and side rails.
Figure 5:
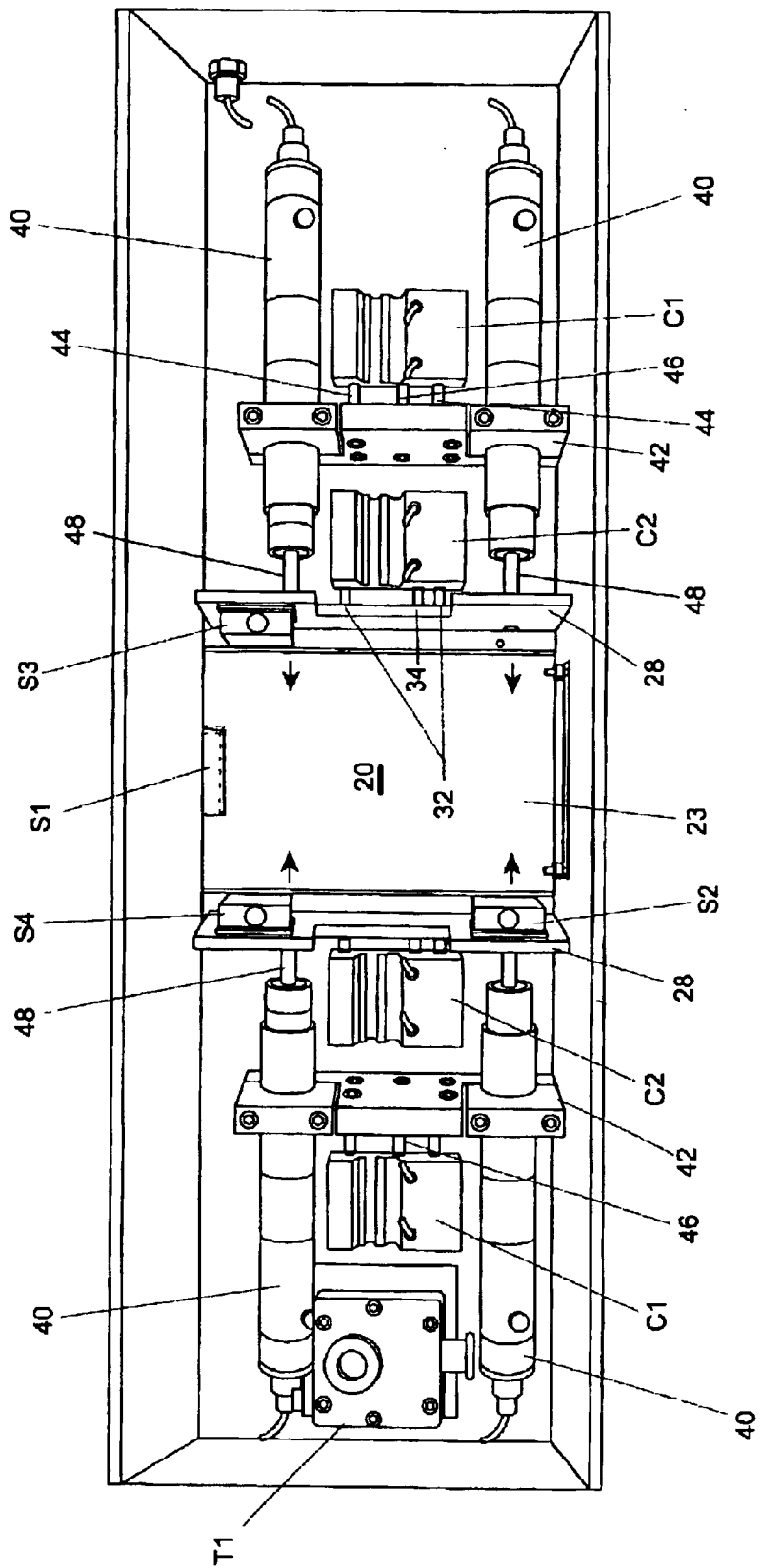
FIG. 5 is an embodiment of an underside view of the jig assembly of FIG. 1.

The jig assembly comprises a bay 20 recessed into the front panel 22 of a rack or framework (not shown). The bay 20 is adapted to receive the HDD 16 "letterbox" style, the HDD 16 being slid in from the front of the bay on a steel base plate 23 (FIG. 5). This substantially reduces "head slap". Opposite sidewalls 24 of the bay are stepped and the HDD 16 is received snugly between the more closely spaced upper parts 24a of the sidewalls, as seen in FIG. 2. At its rear the bay 20 has a pneumatic limit switch S1. The switch S1 is closed when the HDD 16 is pushed fully home in the bay 20—this defines the datum position of the HDD 16 in the bay 20.

The lower parts 24c of the stepped sidewalls 24 are displaced outwardly relative to the upper parts 24a and are joined to the latter by horizontal transition parts 24b. A respective side rail support member 28 is disposed below each transition part 24b in the recess formed by the outwardly displaced parts 24c of the sidewalls 24. The support members 28 are elongated in the front-to-rear direction of the bay 20 and have a generally C-shaped cross-section. They are substantially parallel to one another and each has upper and lower longitudinal grooves 30a, 30b respectively.

Figure 1:
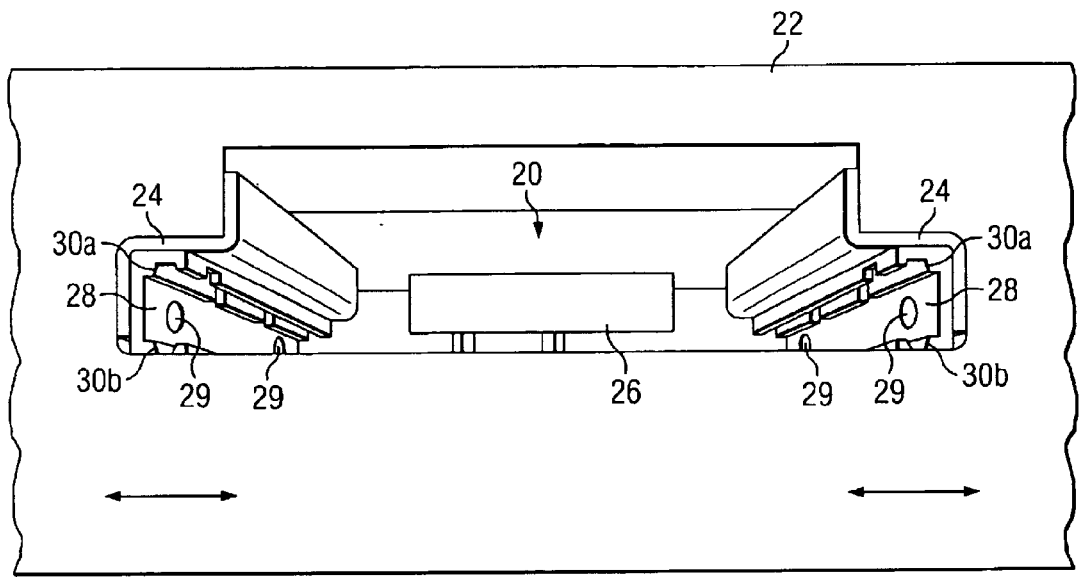
FIG. 1 is a front view of a jig assembly according to a preferred embodiment of the present disclosure.

Each support member 28 is mounted on a pair of guide rods 32, FIG. 5, for movement towards and away from the opposite side edges 14 respectively of an HDD 16 accommodated in the bay 20, i.e. in the direction of the double-headed arrows in FIG. 1. and is also coupled to the piston 34 of a respective single-acting pneumatic cylinder C2. Each support element 28 receives and retains a respective side rail 10, the side rail 10 being slid in from the front of the bay 20 and the upper and lower edges thereof sliding in the respective grooves 30a, 30b. Initially, when the side rails 10 are slid in, the support members 28 are retracted against the lower sidewall parts 24c, as seen in FIG. 1. A further pneumatic limit switch S3 or S4 at the rear end of each support member 28 is closed when the respective rail 10 is pushed fully home in the support member 28 which defines the datum position of each HDD side rail 10 in the bay 20.

As stated, each side rail 10 has two captured screws 12. When the HDD 16 and rails 10 are in their datum positions, the screws 12 are in register with corresponding screw-threaded holes (not shown) in the side edges 14 of the HDD 16. The heads 12a of the screws are also in register with respective holes 29 (FIG. 1) in the support members 28, so that the screw heads 12a can be accessed from the other side of the support member 28 through the holes 29.

On each side of the bay 20 a pair of pneumatic screwdrivers 40 are clamped in a pair of stocks 42, FIG. 5. The screwdrivers are of the type sold by Uryu of Japan under the model number US-LT20. Each pair of stocks 42 (and correspondingly the screwdrivers 40 clamped therein) is mounted on a pair of guide rods 44 for movement towards and away from the respective support members 28, and is also coupled to the piston 46 of a respective double-acting pneumatic cylinder C1. The tool bits 48 of the screwdrivers are aligned with the respective holes 29 (FIG. 1) in the support members 28, so that the screw heads 12a can be engaged by the tool bits 48 through the holes 29 when the screwdrivers are advanced towards the support members 28.

In operation of the jig assembly, the HDD 16 and side rails 10 are loaded into the bay 20 as previously described, the HDD 16 being slid on the base plate 23 and the rails 10 being slid in the support members 28. As soon as the last of the three pneumatic switches S1, S3 and S4 is closed, indicating that the HDD 16 and both side rails 10 are in their datum positions, a pneumatic control circuit (FIG. 6, to be described) automatically actuates the pneumatic cylinders C1 to drive the stocks 42, and hence the screwdrivers 40, inwardly towards the HDD 16 (at the same time, the control circuit supplies pneumatic pressure to the screwdrivers 40).

At some point each tool bit 48 will engage a respective screw head 12a and the screwdrivers react to the pressure of bearing against the screw heads 12a and begin to turn. As the tool bits 48 turn, the screws 12 are driven into the respective screw-threaded holes (not shown) in the side edges 14 of the HDD 16 so that each rail 10 is drawn towards the HDD 16. This in turn also draws the support members 28 within which the rails 10 are retained towards the HDD 16. The screwdrivers 40 are set to switch off automatically at a pre-determined torque limit when the rails 10 are screwed tight against the side edges 14 of the HDD 16. The control circuit causes the cylinders C1 to retract the screwdrivers 40 automatically after a pre-determined time period has elapsed. This time period, which is set by a pneumatic timer T1, is sufficiently long to enable the screws 12 to be tightened as aforesaid.

The operator is now free to withdraw the prepared disk drive, which he does by sliding the HDD 16 with affixed side rails 10 as a unit out of the bay 20, FIG. 4. In doing so, a further pneumatic limit switch S2 located towards the front of the bay 20 is de-actuated having been actuated on insertion of the rails 10. This automatically causes the control circuit to drive the cylinders C2 to retract the now vacant support members 28 back to their original positions (FIG. 1) whereupon the HDD preparation cycle is complete.

Figure 6:
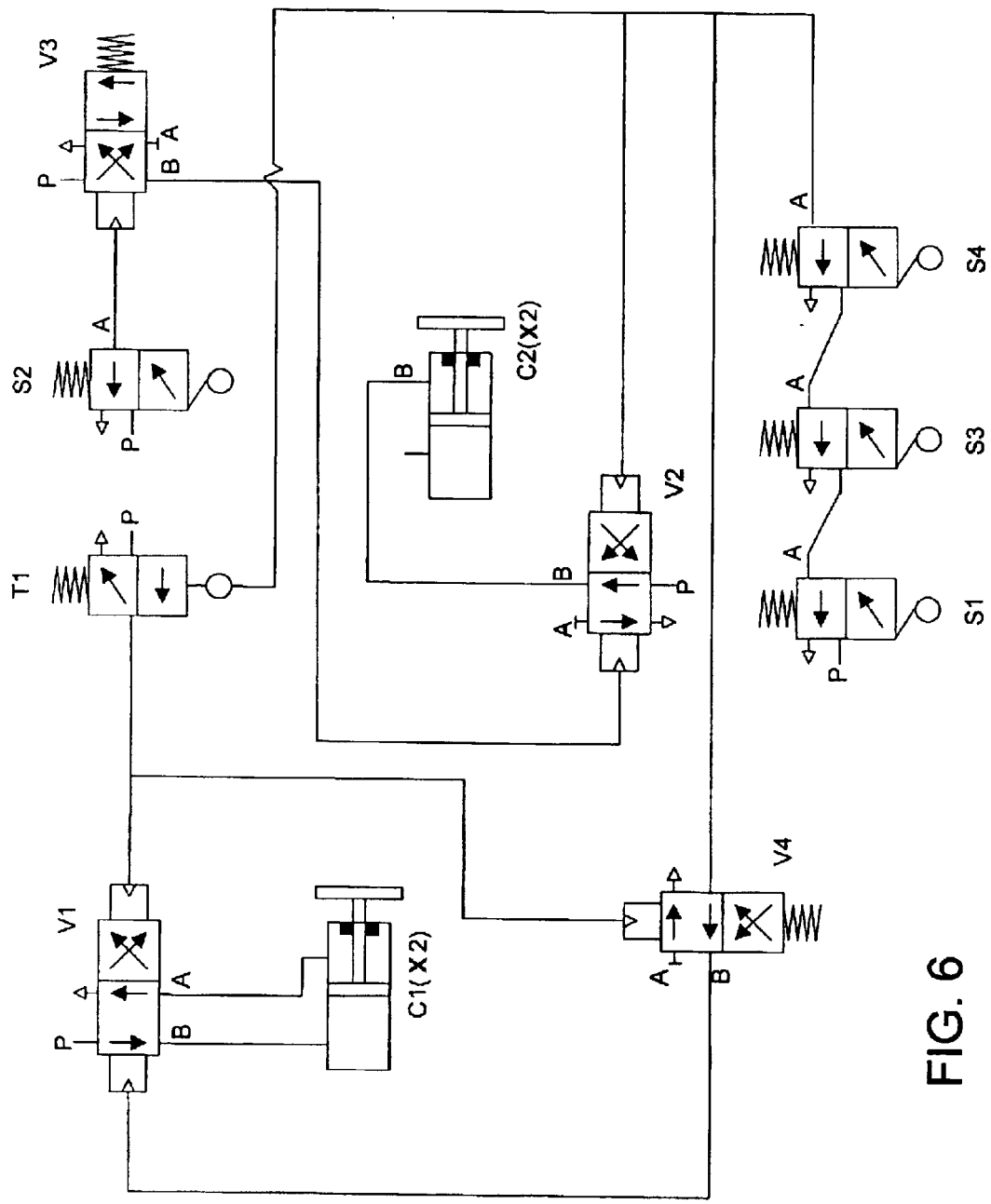
FIG. 6 is a diagram of an embodiment of the pneumatic control circuit of the jig assembly of FIG. 1.

FIG. 6 is a diagram of the pneumatic control circuit used to control the jig assembly of FIGS. 1 to 5. In FIG. 6, C1 and C2 are pneumatic cylinders, V1 and V2 are double pilot 5/2 valves, V3 and V4 are single pilot 5/2 valves, T1 is a pneumatic timer, and S1 to S4 are mechanically-operated pneumatic 3/2 limit switches. P stands for pressure supply, the ground symbol is atmospheric pressure (vented), and the T symbol means a closed inlet/outlet.

When each of switches S1, S3 and S4 are closed, indicating that both the rails 10 and the HDD 16 have all been inserted in the bay 20 to their datum positions, P will be connected to the A outlet of each switch in sequence so providing pressure at the outlet A of S4. This causes valve V2 to vent outlet B and so allows the cylinders C2 to float. This enables the support members 28 to be drawn, with the rails 10, towards the edges 14 of the HDD.

When the prepared drive is withdrawn from the jig assembly, the switches S1-S4 spring open, so connecting the outlet A of S4 to atmospheric pressure. S2 will be the last switch to spring open and causes the pressure from valve V3 outlet B to switch valve V2 so that pressure from valve V2 outlet B retracts the cylinders C2 (this will only happen when pressure is removed from the outlet of S4 so venting the right pilot of V2).

A pneumatic timer T1 operates by bleeding the air pressure from the A outlet of S4 until the timer switches over after a set period. This period is the time after insertion of the disk drive into the jig when the screwdrivers will be retracted and during this period the outlet of T1 is vented.

The valve V4 is needed to vent the left pilot of V1 to allow the timer T1 to actuate the right pilot of V1 and so cause the cylinders C1 to retract. Thus, before T1 switches, the top pilot for V4 is vented and so the spring on the other pilot channels the pressure supplied from S4 to the left pilot of V1 to cause the screwdrivers 40 to extend as soon as pressure is supplied from S4 on initial insertion.

Variations of the pneumatic circuitry are possible; for example, a pneumatic reset switch can be included so that, for example, if an operator inserts a drive without correctly inserting the rails, cylinders C1, C2 can be retracted to their home positions.

The advantages of the above embodiment are that, save for the manual withdrawal of the complete HDD, it is fully automatic once the components are properly loaded into the jig assembly. No external controls require to be activated to initiate the assembly cycle. It will also be seen that only a pneumatic supply is required to operate the jig assembly— no electrical elements (power or controls) are required.

The jig assembly described above directly confers a 75% reduction (from 40 sec to 10 sec) in HDD preparation time and reduces shock induced by the assembly of the rails to below measurable levels (from 90G to less than 10G). This materially reduces the level of HDD failure in the field.

The disclosure is not limited to the embodiment described herein which may be modified or varied without departing from the scope of the disclosure.

What is claimed is:

1. A jig assembly for preparing a disk drive for mounting in a computer, the jig assembly comprising:

a disk drive receiving bay arranged to receive a disk drive in a first datum position and to receive a pair of side rails each in a second datum position, the side rails to be fixed to respective edges of the disk drive, each side rail having a captive screw-threaded fixing device in register with a respective screw-threaded hole in the edge of the disk drive;

at least one powered screwdriver on each side of the bay, each screwdriver having a tool bit in register with a respective screw-threaded fixing device when a respective side rail is in the second datum position, each screwdriver mounted for movement towards and away from the respective side rail such that the tool bit can engage and turn the screw-threaded fixing device; and a respective first actuator for advancing each screwdriver towards the respective side rail such that the tool bit engages the respective screw-threaded fixing device, rotation of the tool bit causing the screw-threaded fixing device to be advanced into the screw-threaded hole in the respective edge of the disk drive whereby the side rail is retained tight against the edge of the disk drive, and for thereafter retracting the screwdriver.

2. A jig assembly as claimed in claim 1, wherein the bay has two substantially parallel side rail support members mounted for movement towards and away from opposite side edges, respectively, of a disk drive accommodated in the bay, each support member being arranged to receive and retain a respective side rail in the second datum position, the screw-threaded fixing device to be advanced into the screw-threaded hole in the respective edge of the disk drive in response to rotation of the tool bit, thereby causing the support member to be drawn towards the disk drive until the side rail is tight against the disk drive, the jig assembly further including a respective second actuator for retracting each support member to its initial position after withdrawal of the disk drive and affixed side rails from the bay.

3. A jig assembly as claimed in claim 2, wherein the support members are configured for slidably accommodating the side rails whereby the disk drive and affixed side rails are slidably withdrawn from the bay.

4. A jig assembly as claimed in claim 2, further including a control circuit operable automatically upon placement of a disk drive in the first datum position and a pair of side rails each in the second datum position to (a) advance the screwdrivers towards the respective side rail support members, (b) rotate each screwdriver to screw the respective screw-threaded fixing device into the respective screw-threaded hole to attach the side rail tight against the edge of the disk drive, and (c) retract each screwdriver.

5. A jig assembly as claimed in claim 4, the control circuit further being operable to automatically retract each support member to its initial position after withdrawal of the disk drive and affixed side rails from the bay.

6. A jig assembly as claimed in claim 4, wherein the first and second actuators and the screwdrivers are pneumatically operated and the control circuit is a pneumatic control circuit.

7. An assembly system for a disk drive comprising:
a fixture having a bay formed therein;
the bay provided to receive an unassembled disk drive and opposed side rails; and
a powered device on opposed sides of the bay provided to automatically apply a fastening device to attach each side rail to a respective side of the disk drive.

8. The system as defined in claim 7 wherein positioning and alignment means are provided in the bay for accurately orienting the side rails and the disk drive prior to attachment.

9. The system as defined in claim 8 further comprising:
a control circuit operable to automatically advance each powered device in response to accurate orientation of the disk drive and side rails.

10. The system as defined in claim 9 wherein the control circuit is operable to automatically retract each powered device in response to application of the fastening devices.

11. A method of preparing a disk drive comprising:
providing a fixture having a bay formed therein;
providing the bay to receive an unassembled disk drive and opposed side rails; and
positioning a powered device on opposed sides of the bay to automatically apply a fastening device to attach each side rail to a respective side of the disk drive.

12. The method as defined in claim 11 further comprising:
providing positioning and alignment means in the bay for accurately orienting the side rails and the disk drive prior to attachment.

13. The method as defined in claim 12 further comprising:
coupling a control circuit operable to automatically advance each powered device in response to accurate orientation of the disk drive and side rails.

14. The method as defined in claim 13 wherein the control circuit is operable to automatically retract each powered device in response to application of the fastening devices.

* * * * *